(12) United States Patent
Plangger (10) Patent No.: US 7,924,515 B2
(45) Date of Patent: Apr. 12, 2011

(54) ADAPTER FOR CONNECTING AN OPTICAL RECORDING DEVICE TO AN OBSERVATION DEVICE

(75) Inventor: Urban Plangger, Innsbruck (AT)

(73) Assignee: Swarovski-Optik KG. (AT)

( * ) Notice: Subject to any disclaimer, the term of this patent is extended or adjusted under 35 U.S.C. 154(b) by 309 days.

(21) Appl. No.: 12/157,470

(22) Filed: Jun. 11, 2008

(65) Prior Publication Data

US 2009/0128934 A1    May 21, 2009

(51) Int. Cl.
*G02B 7/02*    (2006.01)
(52) U.S. Cl. .......................... 359/827; 359/829
(58) Field of Classification Search .............. 359/827
See application file for complete search history.

(56) References Cited

U.S. PATENT DOCUMENTS

| | | | |
|---|---|---|---|
| 1,477,440 A | 12/1923 | Grier | |
| 4,323,304 A | 4/1982 | Ishii | |
| 4,723,864 A | 2/1988 | Umeda | |
| 5,053,794 A | 10/1991 | Benz | |
| 2005/0213959 A1* | 9/2005 | Chiang | 396/428 |

FOREIGN PATENT DOCUMENTS

| | | |
|---|---|---|
| DE | 3544162 A1 | 6/1986 |
| DE | 9413384 U1 | 11/1994 |
| DE | 29616666 U1 | 1/1997 |
| DE | 20005152 U1 | 6/2000 |
| DE | 102006000754 | 4/2007 |
| EP | 0031151 A2 | 7/1981 |
| EP | 1518491 | 3/2005 |
| FR | 2793567 | 11/2000 |
| FR | 2857248 | 1/2005 |

OTHER PUBLICATIONS

Office Action pertaining to priority Austrian Application No. A904/2007, dated Nov. 6, 2007, 5 pgs.

* cited by examiner

*Primary Examiner* — Ricky L Mack
*Assistant Examiner* — James C Jones
(74) *Attorney, Agent, or Firm* — Lerner, David, Littenberg, Krumholz & Mentlik, LLP (57) ABSTRACT

The invention relates to an adapter for connecting the optical path of an optical recording device, in particular a camera, to the optical path of an observation device, with an attachment portion for attaching to one of the two devices, and the adapter has two centering mechanisms for centering the optical axis of a lens of the recording device on the optical axis of an eyepiece of the observation device, and a first centering mechanism cooperates with the eyepiece of the observation device and a second centering mechanism cooperates with the lens of the recording device, and one of the two mechanisms is designed to be attached to the eyepiece of the observation device or to the lens of the recording device by means of the attachment portion to provide a centered fit and hold and the second centering mechanism is designed to provide a centrally oriented fit or hold on the lens of the recording device or on the eyepiece of the observation device when necessary.

41 Claims, 9 Drawing Sheets

ADAPTER FOR CONNECTING AN OPTICAL RECORDING DEVICE TO AN OBSERVATION DEVICE

CROSS REFERENCE TO RELATED APPLICATIONS

Applicant claims priority under 35 U.S.C. §119 of AUSTRIAN Patent Application No. A 904/2007 filed on Jun. 11, 2007.

BACKGROUND OF THE INVENTION

1. Field of the Invention

The invention relates to an adapter for connecting the optical path of an optical recording device, in particular a camera, to the optical path of an optical observation device of the type outlined in the introductory part of claim 1.

2. Prior Art

Such adapters are known. Due to the fact that the smallest movement between the camera and optical observation device, for example a telescope, can significantly reduce image quality, known adapters provide a mechanically fixed connection between the camera and observation device.

For example, patent specification U.S. Pat. No. 5,053,794 discloses an adapter which is screwed onto the internal thread of a filter element disposed on the camera lens, whereas three radially extending screws offset from one another by 120° are used to provide a connection to the eyepiece lens of the observation device.

Another adapter is commercially available, which is designed for a monocular with a screw-off eye cup. This commercially available adapter is screwed onto the thread provided on the camera lens for filters, lens hoods and such like on the one hand and to the thread on the eyepiece lens when the eye cup has been screwed off on the other hand.

Screwing the adapter on and off is tiresome and time-consuming. The known adapters are also only suitable for use with cameras and observation devices which have the appropriate thread.

SUMMARY OF THE INVENTION

Accordingly, the objective of the invention is to propose an adapter which can be easily and quickly attached to all types of camera lenses.

This objective is achieved by means of an adapter for connecting the optical path of an optical recording device, in particular a camera, to the optical path of an observation device, with an attachment portion for providing an attachment to one of the two devices, whereby the adapter has two centering mechanisms for centering the optical axis of a lens of the recording device on the optical axis an eyepiece of the observation device, and a first centering mechanism co-operates with the eyepiece of the observation device and a second centering mechanism co-operates with the lens of the recording device, and one of the two centering mechanisms is designed to provide a centered fit and hold on the eyepiece or on a housing part of the observation device or on the lens or on a housing part of the recording device by means of the attachment portion, and the second centering mechanism is designed to provide a centered and oriented fit on the lens or on a housing part of the recording device or on the eyepiece or on a housing part of the observation device.

Accordingly, the adapter preferably has an attachment portion by which it can be attached to the observation device on the one hand, and on the other hand has a socket portion into which the camera lens can be inserted in order to centre the optical axis of the lens of the camera on the optical axis of the eyepiece of the observation device.

In other words, the camera lens is mounted so that it can be displaced in the adapter and is therefore not fixed in the longitudinal direction. It has been found that image quality essentially depends only on the fact that the optical axes of the camera lens and eyepiece of the observation device are aligned with one another, in other words the optical axis of the lens of the camera is centred on the optical axis of the eyepiece. Any shifting in the direction of the common optical axis, on the other hand, has little influence on image quality. This means that the fine motor movements of a human holding the camera with one hand and optionally the observation device with the other hand is perfectly sufficient to obtain perfect images. To achieve this, the camera lens is pushed into the adapter until it abuts with the eyepiece of the observation device. However, it is also possible to provide a separate stop in the adapter.

The socket portion of the adapter proposed by the invention preferably has a variable internal diameter to enable camera lenses of different diameters to be centred.

In particular, the adapter proposed by the invention is designed for observation devices where the eyepiece is provided with an eye cup. The eye cup is made from soft rubber or some other rubber elastic material and prevents impairment due to laterally intruding light and affords a comfortable support for the device at the front.

To enable it to be attached to the eyepiece quickly, the attachment portion of the adapter proposed by the invention is designed so that it can preferably be pushed onto the eyepiece, and can be so in the radial direction with respect to the optical axis of the eyepiece. To this end, the adapter may have two resilient lugs which locate in a resilient arrangement on one or the other side of the eyepiece. The adapter is therefore oriented with respect to the optical axis of the eyepiece. The eye cup may provide a fixture in the longitudinal direction. In other words, the resilient lugs are preferably designed so that they are able to locate with the eye cup in a resilient arrangement when the adapter is pushed onto the eyepieces. However, the attachment portion may be of a different design. For example, the adapter may have a funnel-shaped attachment portion which is pushed onto the eye cup, for example.

The eye cup may be attached to the eyepiece by means of an eye cup holder. The eye cup holder is preferably designed so that the distance between the eye cup and eyepiece can be varied, for example by pushing or a screw turn. This is particularly important for spectacle wearers because the field of vision becomes bigger the closer the eye is to the eyepiece.

For the purpose of the invention, the eye cup holder may be used to accommodate the adapter. For example, the adapter may be provided in the form of an elastic ring, which lies with its external wall against the adapter holder so that the external wall forms the attachment portion and the camera lens is pushed into the elastic ring retained by the eye cup holder in a clamping fit, in which case the internal wall of the elastic ring constitutes the socket portion of the adapter.

Due to its elasticity, the elastic ring can be adapted to camera lenses of different diameters. To this end, it may be provided in the form of a hose clip or may be made from a rubber elastic material.

To enable the adapter proposed by the invention to be used for cameras with lenses of very different diameters, the adapter may also be provided in the form of a set of elastic rings with different internal diameters.

If the optical observation device is a field glass, the adapter in the form of an elastic ring can be attached to the strap of the field glass for example.

If the adapter proposed by the invention has an attachment portion which can be pushed onto the eyepiece, an elastic ring of this type may constitute the socket portion. This being the case, the elastic ring is preferably designed to be displaceable in the longitudinal direction of the adapter to enable the optimum distance of the camera lens from the eyepiece to be adjusted by pushing the ring axially. To this end, the adapter may be provided in the form of a sleeve. A set of rings with different internal diameters may also be used with this embodiment in order to cater for camera lenses with different diameters.

In one advantageous embodiment of the adapter, the socket portion is provided in the form of a tubular elastic ring and the internal diameter of the elastic ring can be varied depending on a pressure generated by a pump. This pump may be a manually operable pump or alternatively a motor-driven pump, in which case a control system is provided.

In the case of one variant of the adapter, the socket portion has two radially displaceable jaws offset from one another by 180°. On their end faces, these jaws each have two jaw flanks mutually disposed at an angle and facing one another. The jaws or jaw flanks are preferably symmetrical with one another.

In another, preferred embodiment of the invention, the socket portion may have three jaws offset from one another by 120°, which can be moved in the radial direction towards the camera for centering purposes. Instead of three, it would also be possible to provide more jaws distributed around the camera lens, which are preferably disposed equidistantly.

The jaws may be provided in the form of rocker levers which are linked to the adapter so that they can be pivoted and are preferably spring-biased onto the camera lens, for example by means of a resilient ring enclosing the jaws, e.g. in the form of a set spring.

Instead of spring-biasing the jaws, the jaws may also be designed so that they can be set to the diameter of the camera lens. To this end, the jaws are preferably synchronously displaceable in the radial direction.

In an alternative embodiment of the adapter, jaws may be disposed in the socket portion so that they are able to pivot respectively by reference to an axis oriented parallel with the longitudinal axis of the adapter. In one advantageous embodiment, the jaws are of a flap-type design and disposed in an iris pattern.

To enable the movement of the jaws to be synchronously controlled, it is preferable to provide an operating ring which can be rotated about the longitudinal axis of the adapter. The operating ring may have control surfaces formed by separate steps extending in a wedge-shaped arrangement from the inside towards the outside in the circumferential direction at its internal face, which respectively locate on one of the jaws. To this end, the jaws may be spring-biased against the control surfaces, for example. By turning the operating ring, which preferably surrounds the jaws, the jaws can be synchronously moved radially inwards.

Alternatively, the jaws may also be provided in the form of leaf springs, This being the case, each leaf spring may be secured to the operating ring by means of one end in the circumferential direction, whereas the other ends of the respective leaf spring are stationary, in other words connected to the attachment portion of the adapter so that they do not rotate. By turning the operating ring, the leaf springs can therefore be cambered radially inwards in order to adapt to the diameter of the camera lens.

In order to set the rotary position of the operating ring, a catch may be provided between the operating ring and the part of the adapter non-rotatingly connected to the attachment portion. Another option is to provide a scale or similar markings on the operating ring and/or the part of the adapter non-rotatingly connected to the attachment portion, in order to adjust the previously obtained rotation angle of the operating ring for a specific camera lens diameter.

In another embodiment of the invention, the jaws may be designed so that they can be radially displaced. In order to move the jaws, the operating ring may have control grooves extending obliquely in the circumferential direction from the inside towards the outside, in which a respective jaw locates by means of a projection for example.

In order to guide the jaws, radial recesses may be provided in an intermediate ring which is disposed between the attachment portion and the operating ring.

In one advantageous embodiment of the adapter, a motor is provided in the adapter as a means of moving the jaws radially. In addition, a slip clutch may also be interconnected between the motor and a gear operating the jaws in order to limit the force acting on the lens enclosed by the jaws.

In an alternative embodiment of the adapter, it is a two-component unit, i.e. comprises first and a second adapter part. Accordingly, the first centering mechanism is disposed in the first adapter part and the second centering mechanism is disposed in the second adapter part, and the first and the second centering mechanisms each have an attachment portion to provide an attachment to the eyepiece or to the lens. Disposed on the first and second adapter part is another respective centering mechanism, and the other centering mechanism of the first adapter part is designed so that it can be fitted or held in a central orientation on the other centering mechanism of the second adapter part if necessary. To this end, the other centering mechanisms of the two adapter parts are provided with mutually complementary contact surfaces. The contact surfaces are advantageously formed by conical surfaces which are symmetrical with respect to the common longitudinal axis of the adapter. In one advantageous embodiment, magnets may be provided in the region of the contact surfaces in order to generate attraction forces between the first and the second adapter part.

By means of the adapter proposed by the invention, the lens of any camera can be connected to the eyepiece of any optical observation device. For example, the optical observation device may be a field glass or a monocular. In particular, however, the adapter is designed for connecting a field glass to a camera. The camera may be a digital camera in particular, although the adapter proposed by the invention can likewise be used for a camera with a film. The camera may also be a video camera or a camcorder. The respective camera may have both a digital zoom and an optical zoom with an extractable zoom lens. The adapter proposed by the invention is essentially made from synthetic material and may be manufactured by an injection moulding process.

BRIEF DESCRIPTION OF THE DRAWINGS

In order to provide a clearer understanding, the invention will be described in more detail with reference to examples illustrated in the appended drawings. These provide partially schematic illustrations as follows.

DETAILED DESCRIPTION OF PREFERRED EMBODIMENTS

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

Figure 3:
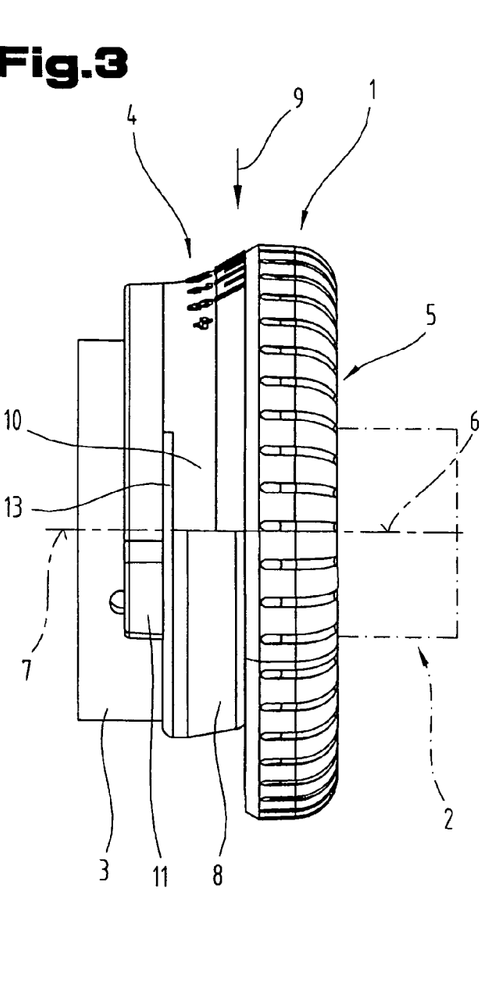
FIG. 3 shows a side view of the adapter illustrated in FIGS. 1 and 2 attached to the eyepiece of an optical observation device.

As illustrated in FIG. 3, an adapter 1 designed to connect the lens 2 of a camera indicated by broken lines to the eyepiece 3 of an optical observation device, not illustrated, has an attachment portion 4 and a socket portion 5 to enable the optical axis 6 of the camera lens 2 to be centred so that the optical axis 6 of the camera lens 2 and the optical axis 7 of the eyepiece 3 coincide.

As illustrated in FIG. 3, an eye cup 8 is provided on the eyepiece 3. The attachment portion 4 of the adapter 1 is pushed onto the eyepiece 3 in the radial direction as indicated by arrow 9.

To this end, the attachment portion 4 has an approximately semi-circular arch region 10 extending round the eye cup 8, as well as two clips or resilient lugs 11, which extend round the eyepiece 3 behind the eye cup 8 at both sides. In order to increase the spring path of the resilient lugs 11, a slot 13 is provided respectively between each lug 11 and the semi-circular region 10.

Figure 6:
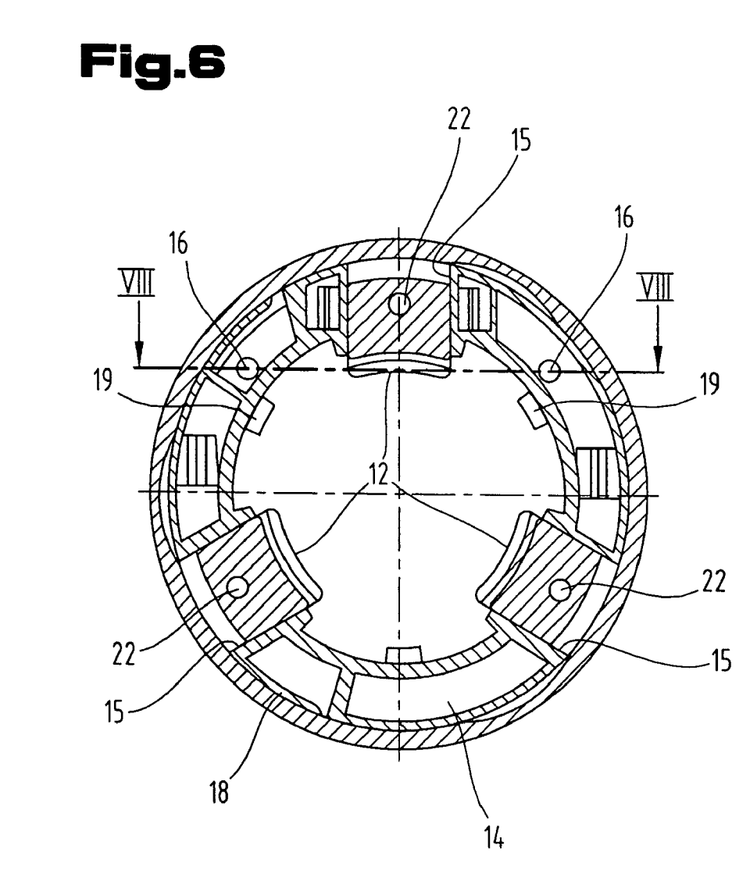
FIGS. 6 and 7 show a section through the adapter along line VI-VI respectively VII-VII indicated in FIG. 4.
Figure 7:
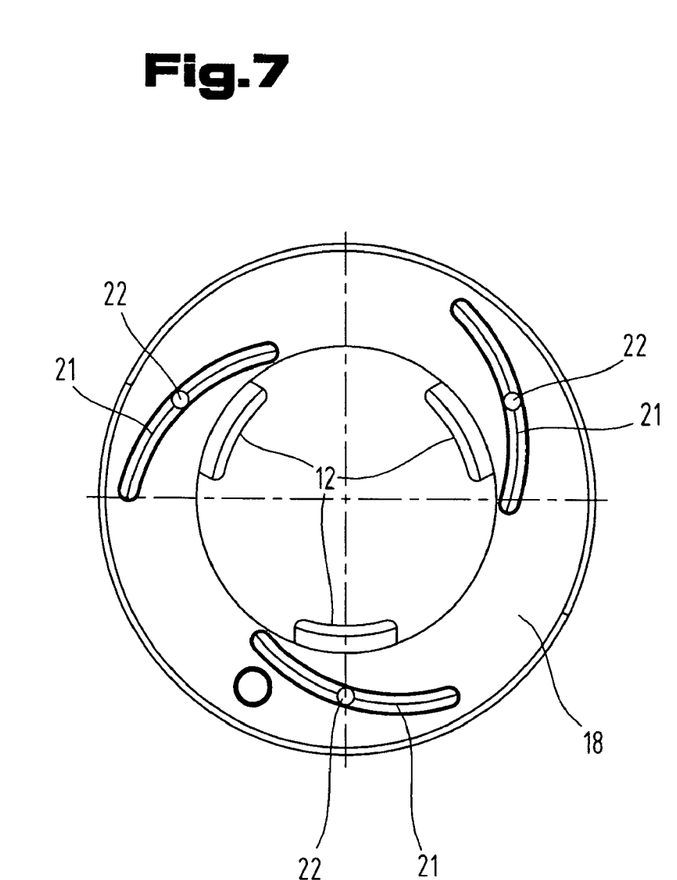
Figure 9:
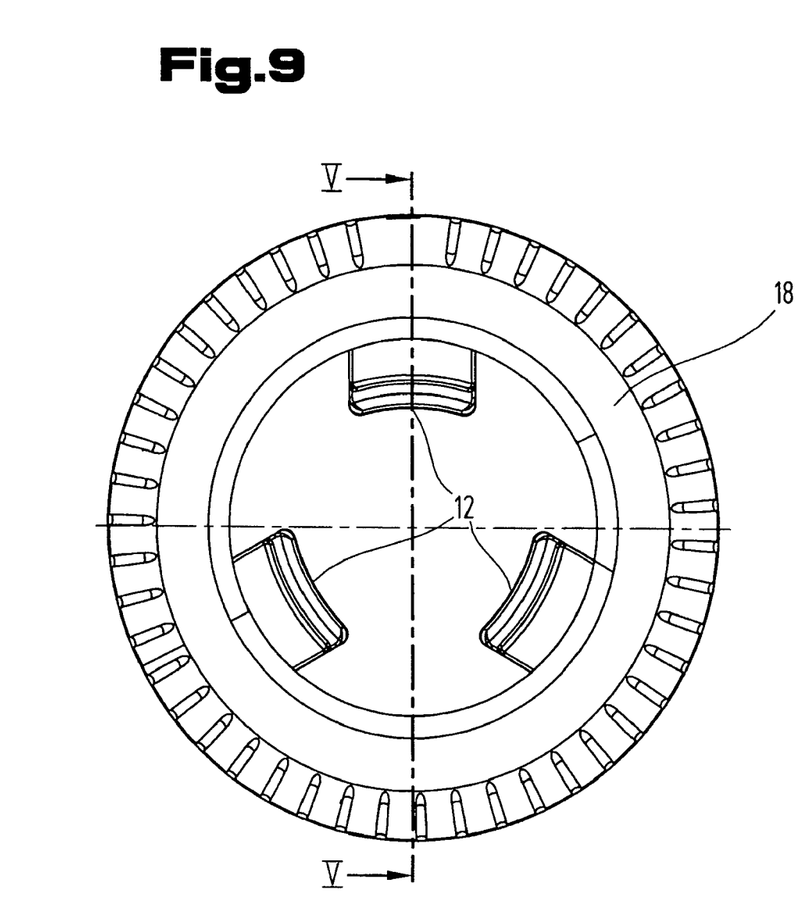
FIG. 9 is a front view of the adapter illustrated in FIGS. 1-8.

As may be seen in particular from FIGS. 6, 7 and 9, the socket portion 5 of the adapter has three jaws 12 distributed at 120° which centre the camera lens 2.

The jaws 12 are radially guided in radial recesses 15 in an intermediate ring 14. The intermediate ring 14 is attached to the attachment portion 4 so that it can not rotate by means of a fixing element 16 (FIGS. 6 and 8).

Mounted on the intermediate ring 14 so that it can rotate about the longitudinal axis 17 (FIG. 4) of the adapter 1 is an operating ring 18. In order to provide a rotatable mounting for the operating ring 18, resilient lugs 19 are formed on the operating ring 18, which extend by means of their hook-shaped, curved ends 20 round the intermediate ring 14 at its face between the jaws 12 directed towards the attachment portion 4.

The operating ring 18 has three control grooves 21 extending obliquely from the inside towards the outside, into which pin-shaped projections 22 provided on the jaws 12 extend. When the operating ring 18 is turned, the jaws 12 are therefore pushed radially in the intermediate ring 14.

Figure 8:
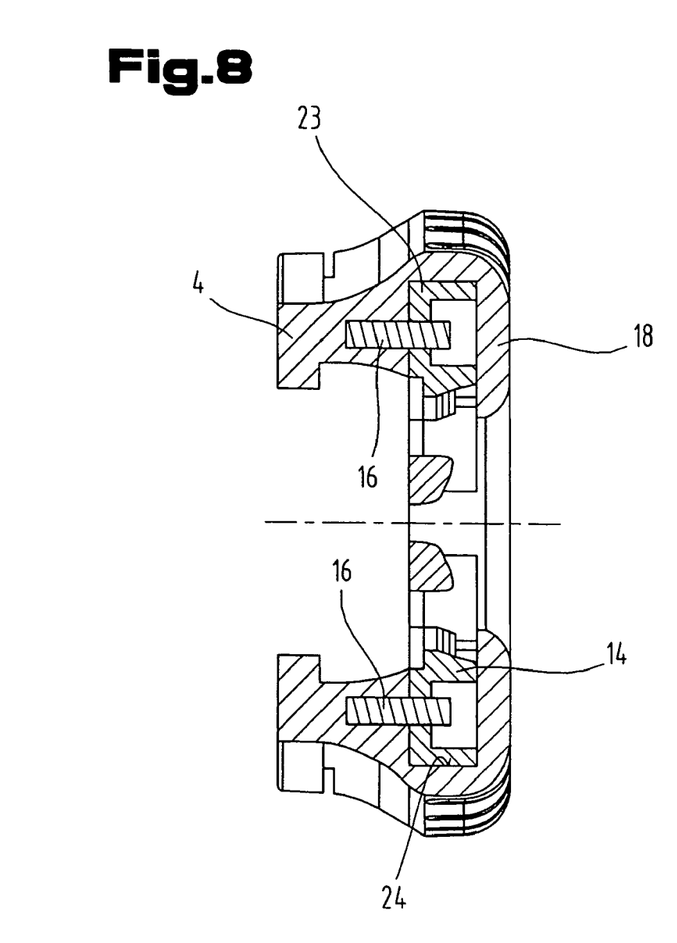
FIG. 8 shows a section along line VIII-VIII indicated in FIG. 6.

Provided on the external circumference 23 of the intermediate ring 14 is a catch, in which a catch on the internal circumference 24 of the operating ring 18 is able to latch (FIG. 8). This enables the rotary position of the operating ring 18 relative to the intermediate ring 14 and hence the position of the jaws 12 to be fixed.

Figure 1:
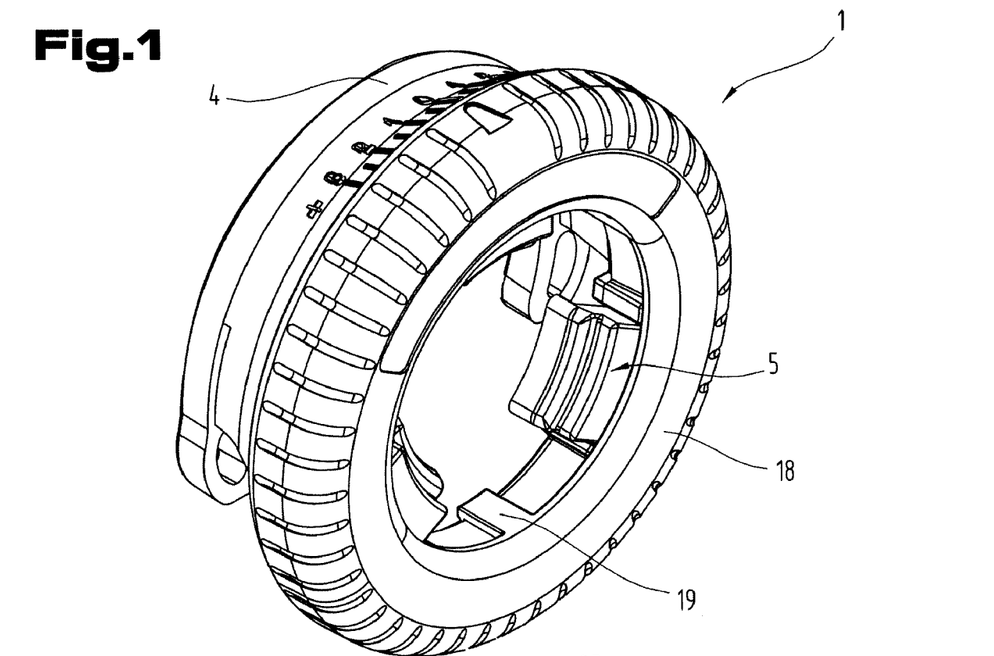
FIGS. 1 and 2 show a perspective view of an adapter based on a first embodiment seen from the front and rear.
Figure 2:
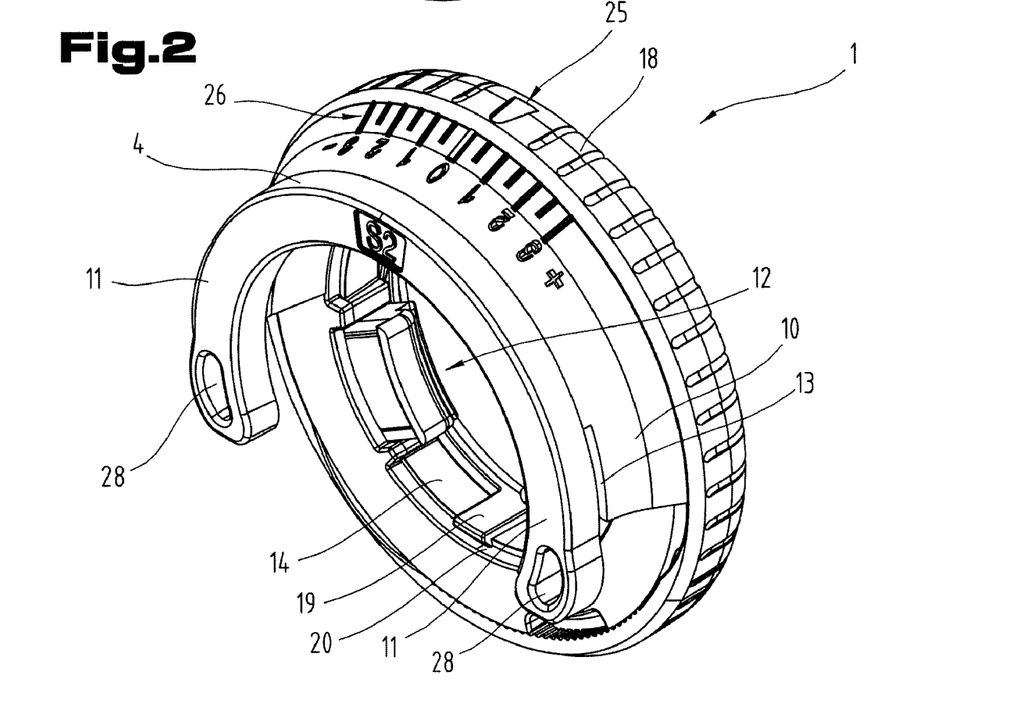
Figure 4:
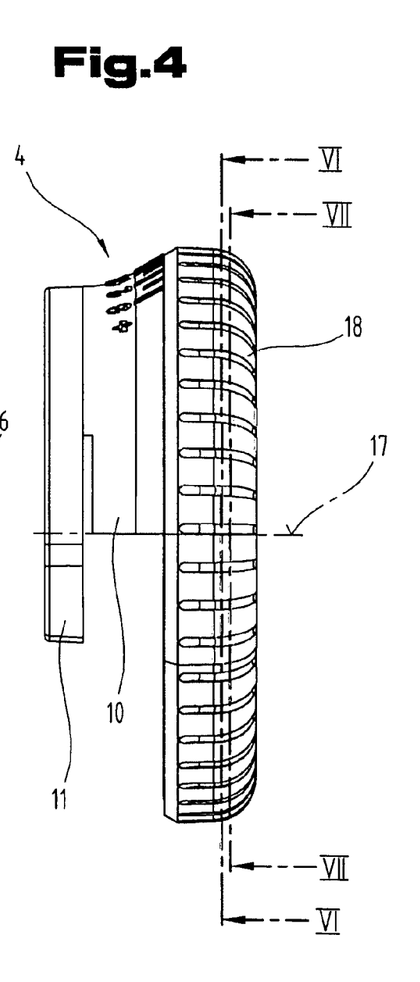
FIG. 4 shows a side view of the adapter.

As illustrated in FIGS. 1, 2 and 4, a marking 25 respectively 26 is provided on the operating ring 18 and on the attachment portion 4 respectively, thereby enabling a specific rotary position of the operating ring 18 relative to the attachment portion 4 to be set, in which the position of the jaws 12 corresponds to the position for centering a camera lens 2 of a specific external diameter.

Figure 5:
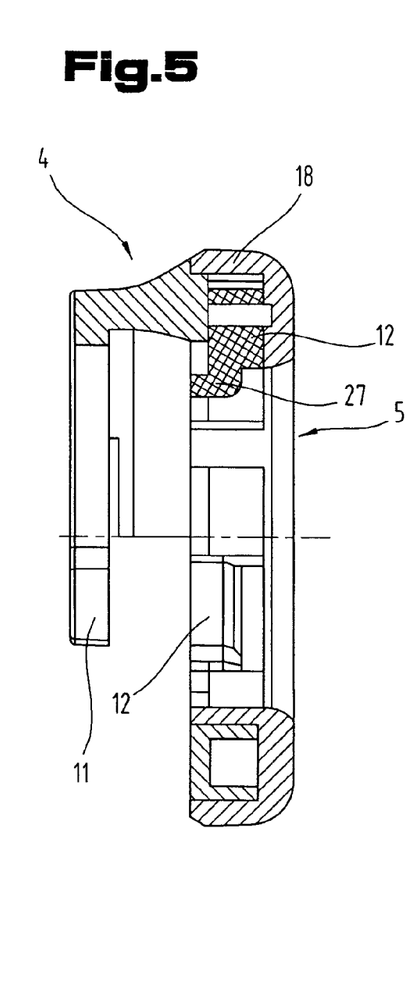
FIG. 5 shows a section through the adapter along line V-V indicated in FIG. 9.

Disposed on the side of each jaw 12 facing the eyepiece 3 is a projection 27 extending radially inwards (FIG. 5). The projections 27 serve as a stop for the camera lens 2 pushed between the jaws 12 in the longitudinal direction of the adapter 1.

The resilient lugs 11 are provided with orifices 28 to which a loop can be attached, by means of which the adapter 1 can be hung on a carrier strap of the observation device when not in use for example.

Figure 10:
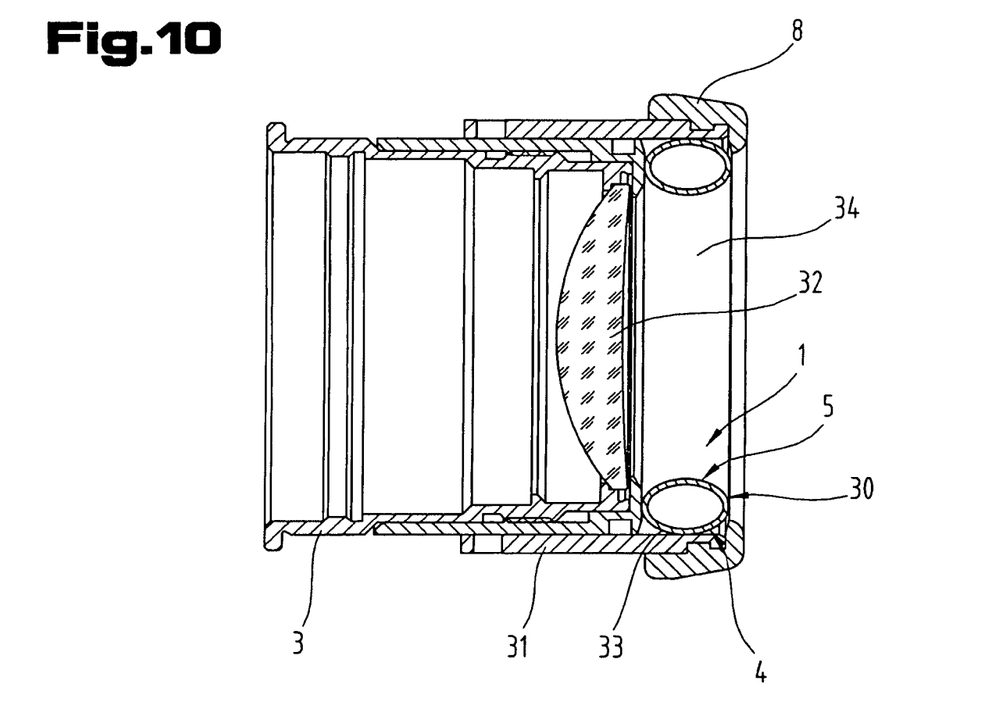
FIG. 10 shows a longitudinal section through an adapter based on a second embodiment attached to the eyepiece of an optical observation device.

In the embodiment illustrated in FIG. 10, the adapter 1 comprises an elastic ring 30. The eye cup 8 is attached to an eye cup holder 31 on the eyepiece 3. The elastic ring 30 is disposed in the eye cup holder 31 in front of the eyepiece lens 32. The elastic ring 30, which may be a flexible tube, lies with its external wall 33 constituting the attachment portion of the adapter 1 inside the eye cup holder 31 in a clamp fit whilst the internal wall 34 of the ring 30 forms the socket portion of the adapter 1.

Instead of a flexible tube, the elastic ring 30 may also be made from foamed material or solid material, for example rubber or a rubber elastic material.

Figure 11:
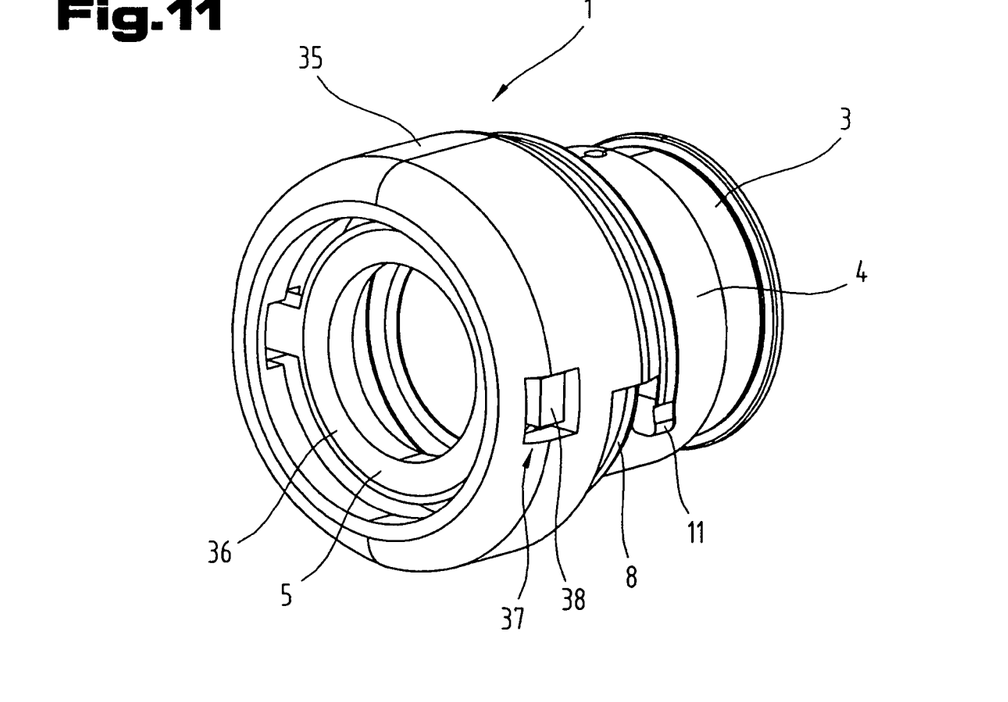
FIG. 11 shows a perspective view of an adapter based on a third embodiment.

In the embodiment illustrated in FIG. 11, the attachment portion 4 is of the same type as the attachment portion 4 of the embodiment illustrated in FIGS. 1-9, in which case details of the attachment portion 4 based on the embodiment illustrated in FIG. 11 may be found in the description given above with respect to the embodiment illustrated in FIGS. 1-9.

The attachment portion 4 in this embodiment is provided with a sleeve 35 in which an elastic ring 36 is disposed. The elastic ring 36 may be of the same design as the elastic ring 30 illustrated in FIG. 10 and details of the ring 36 may be found in the description of the embodiment illustrated in FIG. 10.

The camera lens 2 is inserted in the elastic ring 36 and it therefore constitutes the socket portion in this embodiment. The ring 36 may be designed so that it can be displaced in the longitudinal direction. To this end, as illustrated in FIG. 11, elongate slots 37 are provided in the sleeve 35, through which an operating element 38 connected to the ring 36 extends outwards and is able to push the ring 36. As may be seen from FIG. 11, the attachment portion 4 and the sleeve 35 may be of an integral design.

Figure 12:
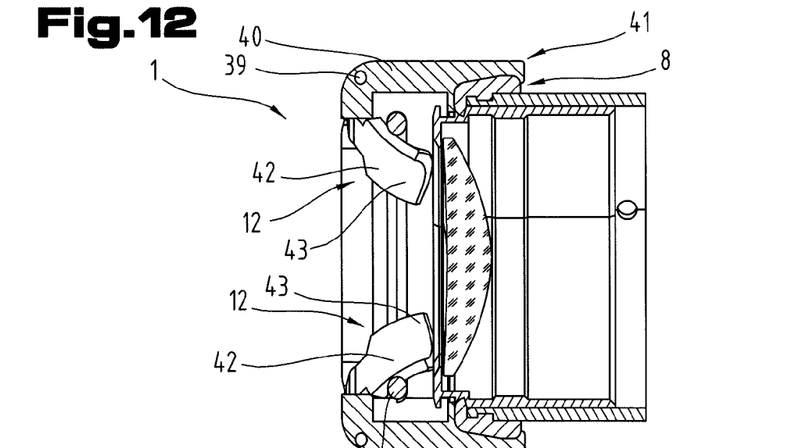
FIG. 12 shows a longitudinal section through an adapter based on a fourth embodiment attached to the eyepiece of an optical observation device.
Figure 13:
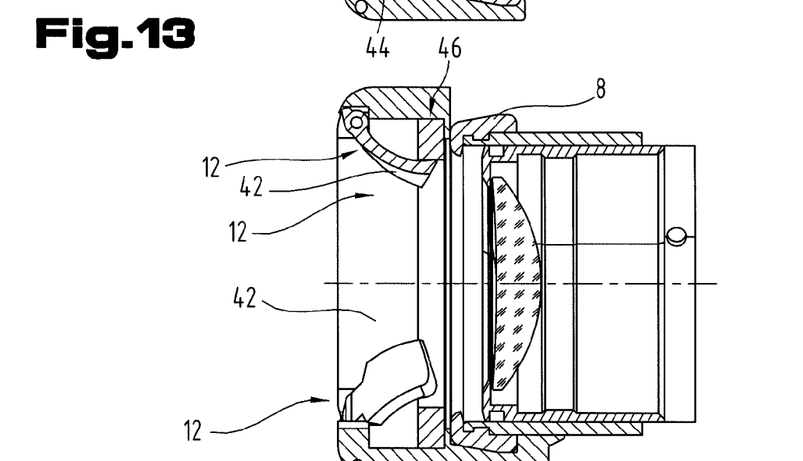
FIG. 13 shows a longitudinal section through an adapter based on a fifth embodiment attached to the eyepiece of an optical observation device.
Figure 14:
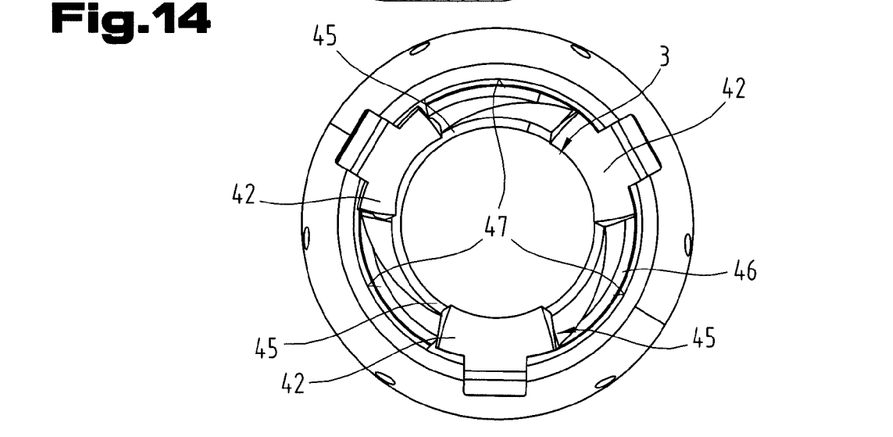
FIG. 14 shows a front view of the adapter illustrated in FIG. 13.

In the two embodiments illustrated in FIG. 12 respectively 13 and 14, the adapter 1 is provided in the form of a sleeve 40. The sleeve 40 has a funnel-shaped diverging portion 41 on its internal face, onto which the eye cup 8 cup is fitted and thus forms the attachment portion 4.

In these two embodiments, the jaws 12 are provided in the form of rocker levers 42, which are linked to the sleeve 40 by their front end, in other words that facing the camera lens 2, so that they are able to pivot transversely to the axes 39 extending transversely to the adapter longitudinal axis. The rocker levers 42 curve outwards towards the eyepiece 3 so that they are able sit in a flat contact with the camera lens 2 by means of their end portions 43.

In the embodiment illustrated in FIG. 12, the three rocker levers 42 are clamped by means of a lock washer 44, which biases them radially so that they sit in contact with the camera lens.

By contrast, in the embodiment illustrated in FIGS. 13 and 14, the radial position of the rocker levers 42 is adjustable. To this end, an operating ring 46 is mounted so that it can rotate in the sleeve 40 and extends round the three rocker levers 42 at a distance from their pivot axis 39. On its internal face, the operating ring 46 has control surfaces 47 separated by steps 45 extending in the circumferential direction in a wedge shape from the inside towards the outside, each of which lies against one of the rocker levers 42.

Although this is not illustrated, the operating ring 46 is connected to an operating element, which projects outside through a slot in the sleeve 40, also not illustrated, extending in the circumferential direction. A catch or similar latching mechanism may be provided between the sleeve 40 and operating ring 46 in order to fix the rotary position of the operating ring 46.

Figure 15:
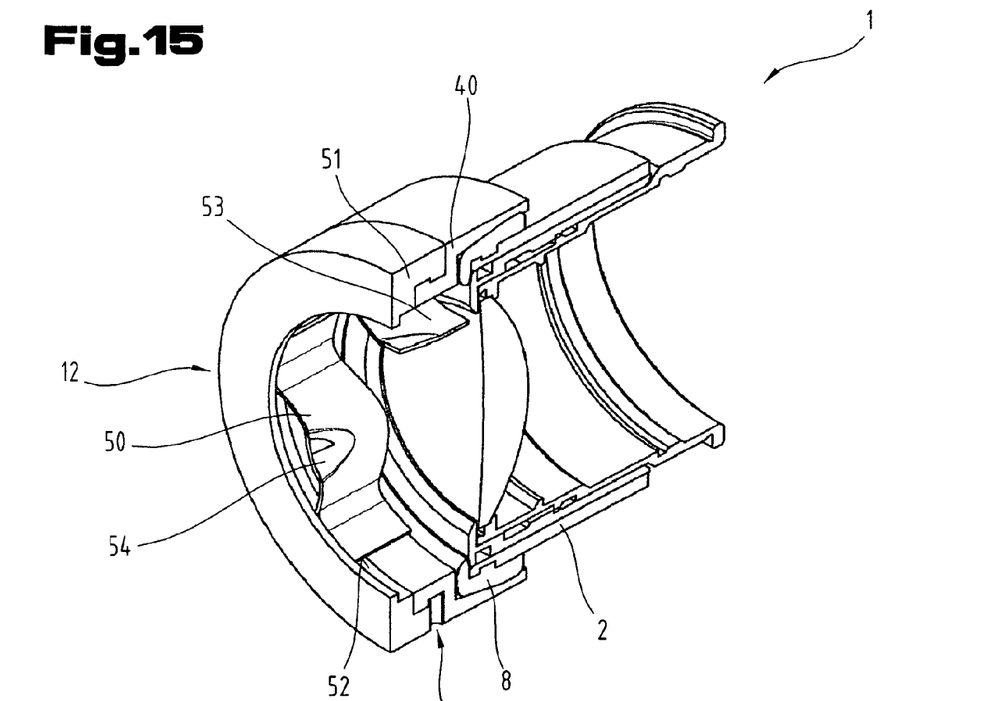
FIG. 15 shows a longitudinal section through an adapter based on a sixth embodiment attached to the eyepiece of an optical observation device.
Figure 16:
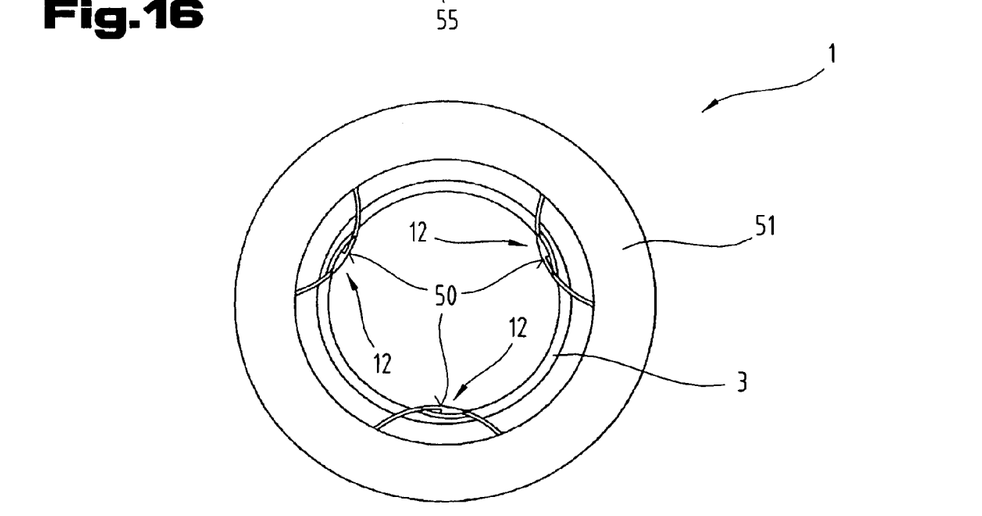
FIG. 16 shows a front view of the adapter illustrated in FIG. 15.

In the embodiment illustrated in FIGS. 15 and 16, the attachment portion 4 is of the same design as the attachment portion illustrated in FIG. 12 and details of the attachment portion used in this embodiment may be found in the description of the attachment portion illustrated in FIG. 12 given above.

In the embodiment illustrated in FIG. 15, the jaws 12 are provided in the form of leaf springs 50. An operating ring 51 is also mounted so that it can rotate on the sleeve 40. Each leaf spring 50 is secured to the operating ring 51 in the circumferential direction by means of its one end and to the sleeve 40 by means of its other end 53.

By rotating the operating ring 51, the leaf springs 50 can be cambered inwards so that they lie against the camera lens in order to centre it. On the side facing the camera lens, the leaf springs 50 have concave indentations 54 so that they lie in flat abutment with the camera lens.

A catch mechanism is also provided in this embodiment, which comprises a catch element 55 disposed in the operating ring 51 and is spring-biased onto the sleeve 40 so that it locates in catch recesses provided in the sleeve 40.

Figures 17, 18, 19:
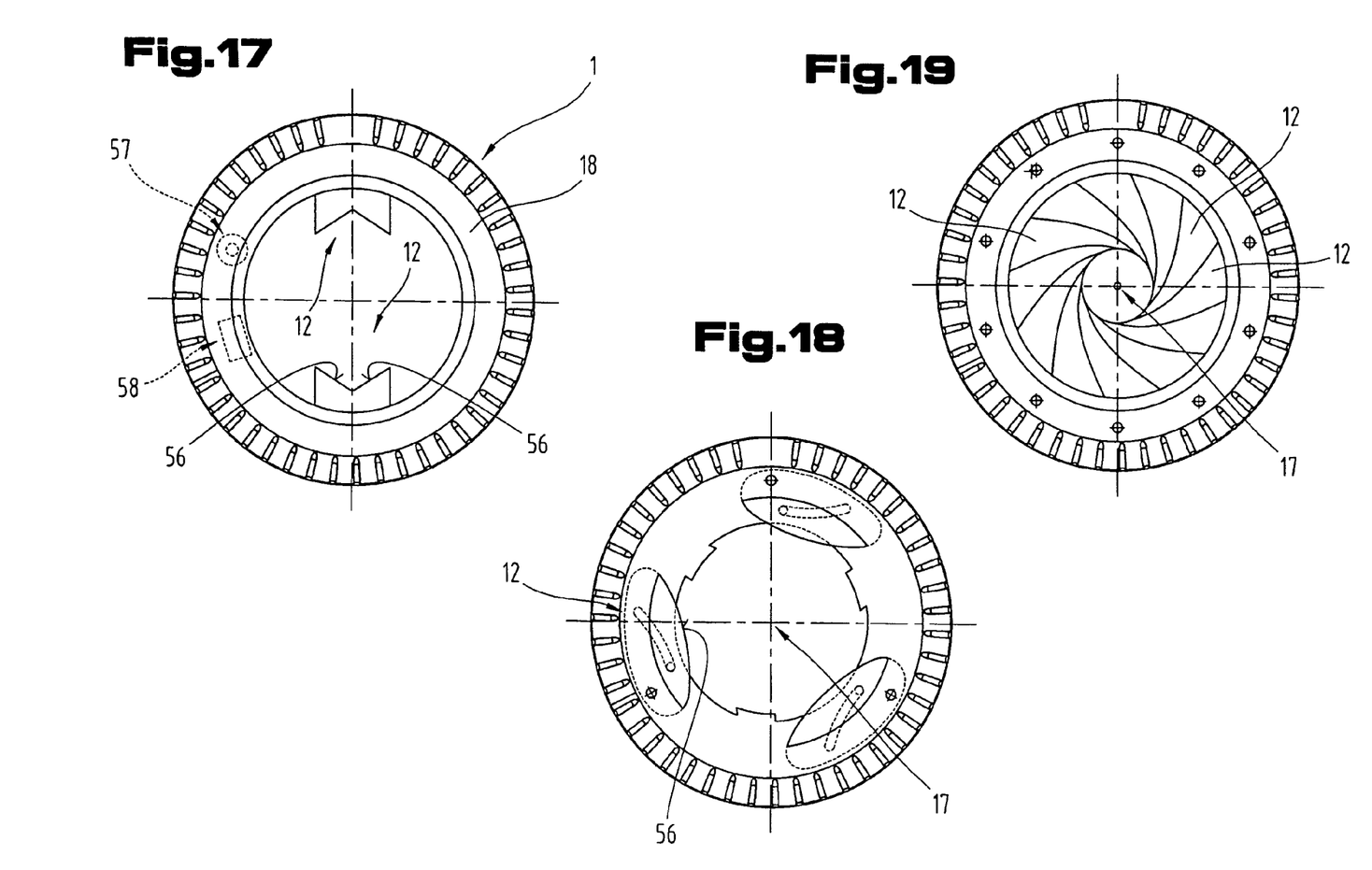
FIG. 17 shows a front view of an adapter based on a seventh embodiment.
FIG. 18 shows a front view of an adapter based on eighth embodiment.
FIG. 19 shows a front view of an adapter based on a ninth embodiment with a socket portion in the form of an iris.

The adapter illustrated in FIG. 17 is an alternative embodiment of the adapter 1. The socket portion 5 of the adapter 1 has two jaws 12 offset by 180°. The jaws 12 each comprise two obliquely disposed, mutually facing jaw flanks 56 so that the camera lens 2 can be centred between the jaws 12. The jaw flanks 56 are also preferably flat and of a symmetrical shape with respect to one another. The jaws 12 are displaced in the same way as the embodiment illustrated as an example in FIGS. 1 to 9 by turning the operating ring 18.

In another alternative embodiment of the adapter 1, the jaws 12 may be radially displaced with the aid of a motor 57 (indicated by broken lines). The motor 57 is preferably electrically operated and a battery is provided in the adapter 1 as a power source as well as a control unit 58. In this embodiment of the adapter 1, the operating ring 18 acts as a switch, which causes the jaws 12 to open when turned in one direction and, when turned in the other direction, causes the jaws 12 to move towards one another in the direction towards the camera lens 2 inserted between them. The motor 57 is preferably coupled to the gear operating the jaws 12 via an interconnected slip clutch, so that the force exerted by the jaws 12 on the camera lens 2 is limited, thereby preventing the lens 2 from being damaged. An alternative way of limiting the force 4 applied to the lens 2 is to provide expediently disposed force sensors (not illustrated).

FIG. 18 illustrates another example of an embodiment of the adapter 1 which represents an alternative to that illustrated in FIGS. 1 to 9. The jaws 12 in this instance are disposed so that they are able to pivot relative to an axis extending parallel with the longitudinal axis 17 of the adapter 1. The jaw flank 56 of the jaws 12 preferably has a convex curvature. As described above, these jaws 12 may be moved manually or driven by motor.

FIG. 19 illustrates an example of an embodiment of the adapter 1 with a socket portion 5 of a type based on an iris. To this end, the adapter 1 is pivoted by means of jaws 12 of a flap-type design, each about an axis extending parallel with the longitudinal axis 17.

Figure 20:
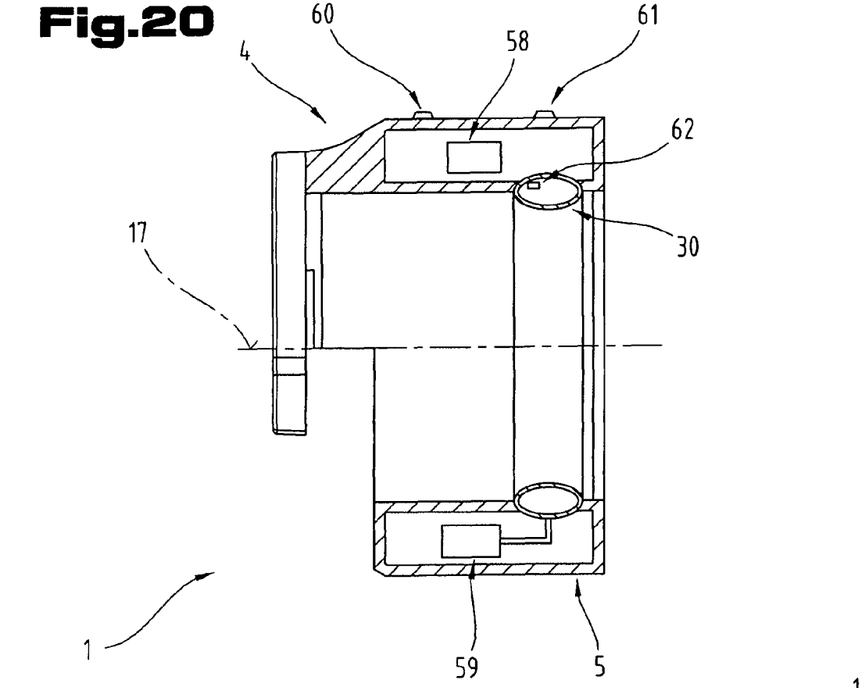
FIG. 20 shows a longitudinal section of the adapter in a tenth embodiment with a pneumatically operable socket portion.

FIG. 20 illustrates an example of an embodiment of the adapter 1 with a pneumatically operated socket portion 5. The tubular elastic ring 30 is connected to a pump 59 in this instance, so that it can be pumped up to a greater or lesser degree. This being the case, the internal diameter of the elastic ring 30 can be varied as a function of the pressure generated by the pump 59. An increase or reduction in pressure is triggered by operating a switch 60 respectively 61 so that the pump 59 is activated accordingly via the control unit 58. In order to monitor the pressure in the elastic ring 30, it or the pump 59 may be provided with a pressure sensor 62, which has a signalling connection to the control unit 58. The pump 59 is therefore preferably a motor-driven pump. As an alternative, however, it may also be a manually operated pump 59, for example an inflatable bellows.

As explained above, the adapter 1 is designed to co-operate with different types of optical recording devices or cameras, for example a digital camera, a camera containing a film, a video camera or a camcorder. The adapter 1 is therefore used to connect the optical path of an optical recording device to the optical path of an observation device. In the embodiments of the adapter 1 described as examples above, the attachment portion 4 is attached to the observation device or to the eyepiece 3 of the observation device. The lens 2 of the camera is pushed into the socket portion 5 of the adapter 1. The attachment portion 4 and the socket portion 5 respectively serve as a first and a second centering mechanism, by means of which the eyepiece 3 of the observation device as well as the lens 2 of the recording device are centered relative to the longitudinal axis 17 of the adapter 1. The optical axis 6 of the lens 2 of the recording device is therefore centered on the optical axis 7 of the eyepiece 3 of the observation device. Alternatively, the adapter 1 may be designed so that the attachment portion 4 can be attached to the lens 2 of the recording device for fitting purposes, whilst the eyepiece 3 of the observation device is pushed into the socket portion 5. However, the reciprocal linking of the optical paths of the optical recording device and observation device need not be obtained by attaching or fitting the adapter 1 to or on a housing part of the eyepiece 3 or a housing part of the lens 2. An alternative option is to centre the optical axes 6, 7 by attaching or fitting the adapter 1 to or on another housing part of the observation device or a housing part of the recording device. To this end, the relevant housing part of the observation device should sit in a fixed spatial relationship with the optical axis 7 of the eyepiece 3. The same applies to the relevant housing part of the recording device and the optical axis 6 of the lens 2.

Figure 21:
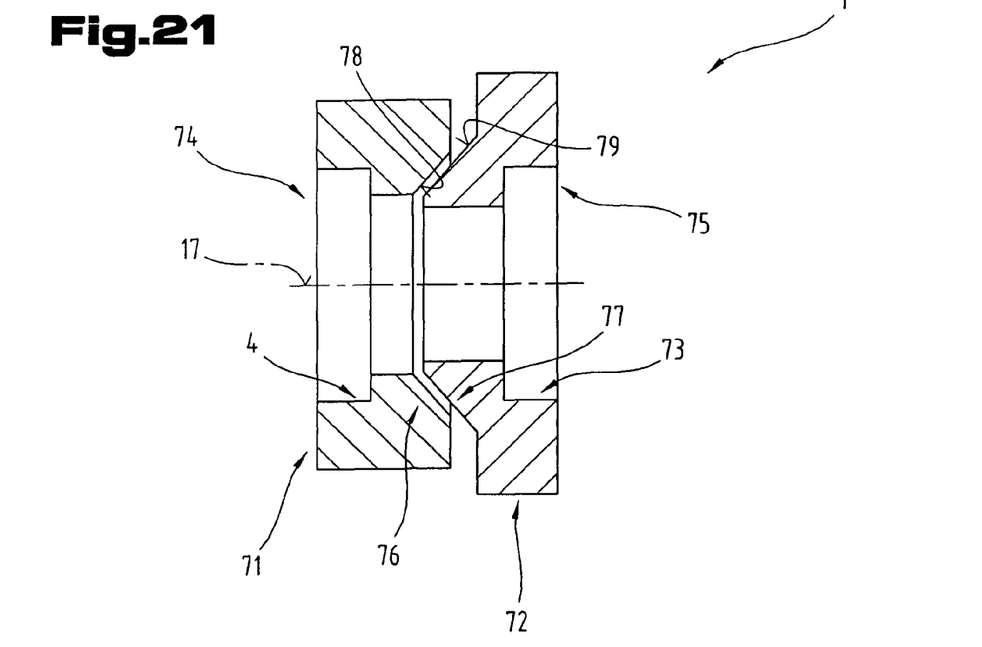
FIG. 21 shows a longitudinal section of a two-component adapter.

FIG. 21 illustrates an adapter 1 based on a two-component design. It comprises a first adapter part 71 incorporating the attachment portion 4 for fitting on the eyepiece 3 and a second adapter part 72 incorporating an attachment portion 73 for fitting on the camera lens 2. The attachment portion 4 of the first adapter part 71 acts as a first centering mechanism 74 to permit centering by reference to the common longitudinal axis 17 of the adapter 1. The attachment portion 73 of the second adapter part 72 likewise acts as a second centering mechanism 75. On its side facing away from the first centering mechanism 74, the first adapter part 71 has another centering mechanism 76. On the side facing away from the second centering mechanism 75, the second adapter likewise has another centering mechanism 77. These other centering mechanisms 76, 77 are designed so that the first and second adapters part 71, 72 can be moved into contact in a centered orientation. In other words, the other mechanism 76 of the first adapter part 71 can be moved into contact with the second centering mechanism 77 of the second adapter part 72. The other mechanisms 76, 77 of the first respectively second adapter part 71, 72 are preferably provided with mutually complementary contact surfaces 78, 79. As illustrated in FIG. 21, the contact surfaces 78, 79 are provided in the form of conical surfaces disposed symmetrically with respect to the longitudinal axis 17 of the adapter 1 and with the same cone angle. When the two adapter parts 71, 72 are assembled, the other centering mechanism 77 of the second adapter part 72 is accommodated in the other centering mechanism 76 of the first adapter part 71 and the two are in contact, simultaneously resulting in an alignment of the longitudinal axes with the common longitudinal axis 17. By contrast with the way the adapter parts 71, 72 fit on the lens 2 or eyepiece 3, a relatively easily releasable contact or attachment id provided between the other centering mechanisms 76, 77. This contact may be additionally assisted by magnets disposed in the region of the contact surfaces 78, 79 which create forces of attraction between the first and second adapter part 71, 72. The attraction forces of the magnets are limited to enable the two adapter parts 71, 72 to be pulled apart from one another relatively easily.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

The embodiments illustrated as examples represent possible design variants of the adapter 1, and it should be pointed out at this stage that the invention is not specifically limited to the design variants specifically illustrated, and instead the individual design variants may be used in different combinations with one another and these possible variations lie within the reach of the person skilled in this technical field given the disclosed technical teaching. Accordingly, all conceivable design variants which can be obtained by combining individual details of the design variants described and illustrated are possible and fall within the scope of the invention.

For the sake of good order, finally, it should be pointed out that, in order to provide a clearer understanding of the structure of the adapter 1, it and its constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 1 to 9; 10; 11; 12 to 14; 15, 16; 17; 18; 19; 20 and 21 constitute independent solutions proposed by the invention in their own right. The objectives and associated solutions proposed by the invention may be found in the detailed descriptions of these drawings.

LIST OF REFERENCE NUMBERS

1 Adapter
2 Lens
3 Eyepiece lens
4 Attachment portion
5 Socket portion
6 Axis
7 Axis
8 Eye cup
9 Arrow
10 Arch region
11 Resilient lug
12 Jaws
13 Slot
14 Intermediate ring
15 Radial recess
16 Fixing element
17 Longitudinal axis
18 Operating ring
19 Resilient lug
20 End
21 Control groove
22 Projection
23 External circumference
24 Internal circumference
25 Marking
26 Marking
27 Projection
28 Orifice
29
30 Ring
31 Eye cup holder
32 Lens of eyepiece lens
33 External wall
34 Internal wall
35 Sleeve
36 Ring
37 Elongate slot 38 Operating element
39 Axis
40 Sleeve
41 Portion
42 Rocker lever
43 End portion
44 Lock washer
45 Step
46 Operating ring
47 Control surface
50 Leaf spring
51 Operating ring
52 End
53 End
54 Indentation
55 Catch element
56 Jaw flank
57 Motor
58 Control unit
59 Pump
60 Switch
61 Switch
62 Pressure sensor
71 First adapter part
72 Second adapter part
73 Attachment portion
74 First centering mechanism
75 Second centering mechanism
76 Other centering mechanism
77 Other centering mechanism
78 Contact surface
79 Contact surface

What is claimed is:

1. Adapter for connecting the optical path of an optical recording device, in particular a camera, to the optical path of an observation device, with an attachment portion for providing an attachment to one of the two devices, wherein the adapter has two centering mechanisms for centering the optical axis of a lens of the recording device on the optical axis of an eyepiece of the observation device, and a first centering mechanism co-operates with the eyepiece of the observation device and a second centering mechanism co-operates with the lens of the recording device, and the first centering mechanism is designed to be attached to the eyepiece or to a housing part of the observation device by means of the attachment portion to provide a centered fit and hold of the adapter, and the second centering mechanism is designed to provide a centered fit or hold on the lens or on a housing part of the recording device when necessary, wherein the attachment portion of said first centering mechanism comprises an approximately semi-circular arch region with two resilient lugs, wherein the attachment portion of the adapter can be pushed onto the eyepiece in the radial direction.

2. Adapter as claimed in claim 1, wherein the second centering mechanism is formed by means of a socket portion, into which the camera lens can be pushed.

3. Adapter as claimed in claim 2, wherein the socket portion has a variable internal diameter to enable camera lenses with differing diameters to be attached.

4. Adapter as claimed in claim 1, wherein the eyepiece of the observation device is provided with an eye cup and the attachment portion is designed to be attached to the eyepiece provided with the eye cup.

5. Adapter as claimed in claim 4, wherein the resilient lugs locate round the eye cup when the adapter is attached to the eyepiece.

6. Adapter as claimed in claim 4, wherein the eye cup can be attached to an eye cup holder on the eyepiece of the observation device.

7. Adapter as claimed in claim 2, wherein the socket portion comprises a tubular elastic ring and the internal diameter of the elastic ring can be varied as a function of a pressure generated by a pump.

8. Adapter as claimed in claim 7, wherein a control unit is provided for activating the pump.

9. Adapter as claimed in claim 8, wherein a pressure sensor is provided as a means of monitoring the pressure in the elastic ring and is connected so as to emit signals to the control unit.

10. Adapter as claimed in claim 2, wherein the socket portion has a sleeve provided with an elastic ring inside.

11. Adapter as claimed in claim 10, wherein the elastic ring can be displaced in the longitudinal direction.

12. Adapter as claimed in claim 2, wherein the socket portion has two radially displaceable jaws offset by 180°.

13. Adapter as claimed in claim 12, wherein the jaws each comprise two obliquely disposed and mutually facing jaw flanks.

14. Adapter as claimed in claim 2, wherein the socket portion has at least three radially displaceable jaws disposed equidistantly.

15. Adapter as claimed in claim 14, wherein the jaws are spring-biased onto the camera lens.

16. Adapter as claimed in claim 15, wherein a lock washer extending round the jaws generates the spring biasing action.

17. Adapter as claimed in claim 14, wherein the radial position of the jaws can be adjusted to the diameter of the camera lens.

18. Adapter as claimed in claim 17, wherein the jaws can be moved synchronously in the radial direction in order to adjust to the camera lens diameter.

19. Adapter as claimed in claim 18, wherein the jaws are disposed so that they can pivot with respect to an axis oriented parallel with the longitudinal axis of the adapter.

20. Adapter as claimed in claim 19, wherein the jaws are of a flap-type design and are disposed in an iris pattern.

21. Adapter as claimed in claim 18, wherein an operating ring rotatable about the longitudinal axis of the adapter is provided as a means of synchronously moving the jaws.

22. Adapter as claimed in claim 21, wherein the operating ring can be fixed by means of a catch system or similar.

23. Adapter as claimed in claim 21, wherein the operating ring has a marking for setting its rotary position for a specific camera lens diameter.

24. Adapter as claimed in claim 21, wherein the operating ring extends round the jaws.

25. Adapter as claimed in claim 21, wherein the operating ring has control surfaces extending in a wedge shape in the circumferential direction from the inside to the outside on its internal face, which respectively act on one of the jaws.

26. Adapter as claimed in claim 12, wherein a motor is provided as a means of radially moving the jaws.

27. Adapter as claimed in claim 26, wherein a slip clutch is interconnected between the motor and a gear operating the jaws.

28. Adapter as claimed in claim 14, wherein the jaws comprise rocker levers pivotably linked to the adapter.

29. Adapter as claimed in claim 14, wherein jaws comprise leaf springs.

30. Adapter as claimed in claim 21, wherein each leaf spring is connected in the circumferential direction to the operating ring by one end and by its other end is connected to the attachment portion of the adapter so that it can not rotate.

31. Adapter as claimed in claim 14, wherein the jaws are guided in displacement.

32. Adapter as claimed in claim 31, wherein the jaws are guided in radial recesses as they are displaced.

33. Adapter as claimed in claim 21, wherein the operating ring has control grooves extending obliquely from the inside towards the outside in the circumferential direction, which operate the respective jaws by means of a projection.

34. Adapter as claimed in claim 32, wherein the radial recesses in which the jaws are guided are disposed in an intermediate ring connected to the attachment portion of the adapter so that it can not rotate.

35. Adapter as claimed in claim 24, wherein the operating ring is mounted so that it can rotate on the intermediate ring.

36. Adapter as claimed in claim 35, wherein the operating ring has lugs to provide a rotatable mount on the intermediate ring, which are respectively disposed between two jaws on the internal face of the intermediate ring and locate round the intermediate ring.

37. Adapter as claimed in claim 1, wherein it comprises a first adapter part incorporating the first centering mechanism and a second adapter part incorporating the second centering mechanism, and the first and second centering mechanism are respectively provided in the form of an attachment portion for attaching to the eyepiece or to the lens, and the first adapter part and second adapter part are respectively provided with another centering mechanism, and the other centering mechanism of the first adapter part is designed to provide a centrally oriented fit or hold on the other centering mechanism of the second adapter part when necessary.

38. Adapter as claimed in claim 37, wherein the other centering mechanism of the first adapter part and the other centering mechanism of the second adapter part are provided with mutually complementary contact surfaces.

39. Adapter as claimed in claim 38, wherein the contact surfaces are provided in the form of conical surfaces which are symmetrical by reference to the longitudinal axis of the adapter.

40. Adapter as claimed in claim 38, wherein, magnets are disposed in the region of the contact surfaces for generating forces of attraction between the first and second adapter part.

41. Adapter for connecting the optical path of an optical recording device, in particular a camera, to the optical path of an observation device, with an attachment portion for providing an attachment to one of the two devices, wherein the adapter has two centering mechanisms for centering the optical axis of a lens of the recording device on the optical axis of an eyepiece of the observation device, and a first centering mechanism co-operates with the eyepiece of the observation device and a second centering mechanism co-operates with the lens of the recording device, and one of the two centering mechanisms is designed to be attached to the eyepiece or to a housing part of the observation device or to the lens or to a housing part of the recording device by means of the attachment portion to provide a centered fit and hold of the adapter, and the second centering mechanism is designed to provide a centered fit or hold on the lens or on a housing part of the recording device or on the eyepiece or on a housing part of the observation device when necessary.

\* \* \* \* \*